Nov. 30, 1926.
H. L. KENT
MOTOR CYCLE
Filed July 11. 1923
1,608,512
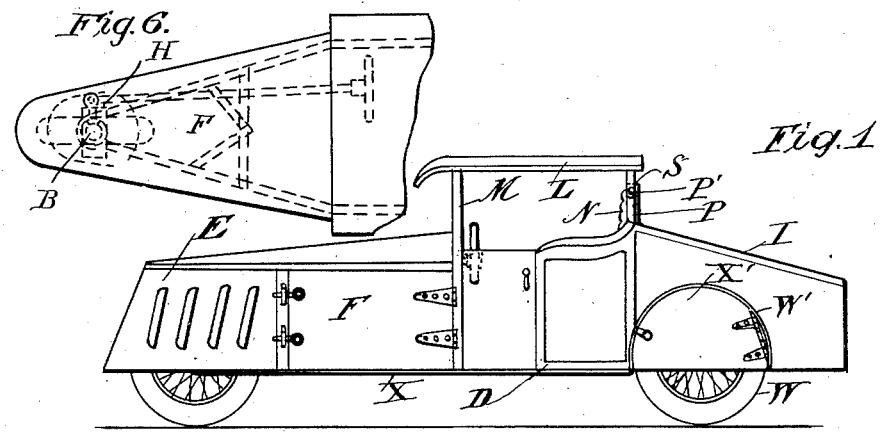
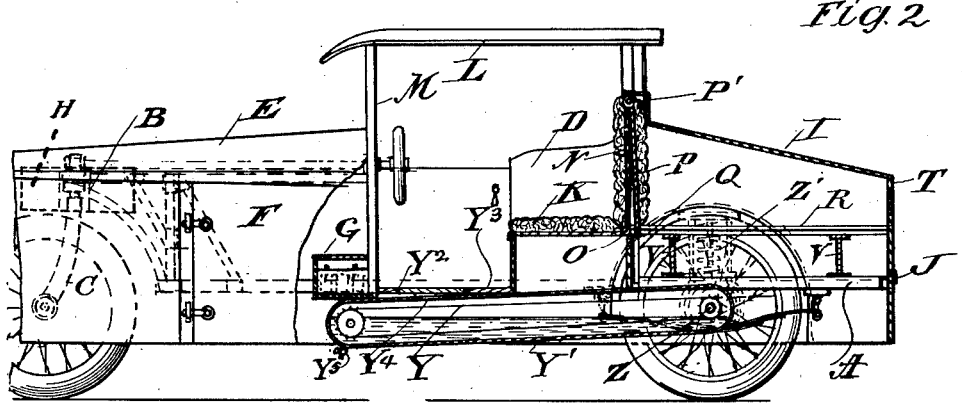
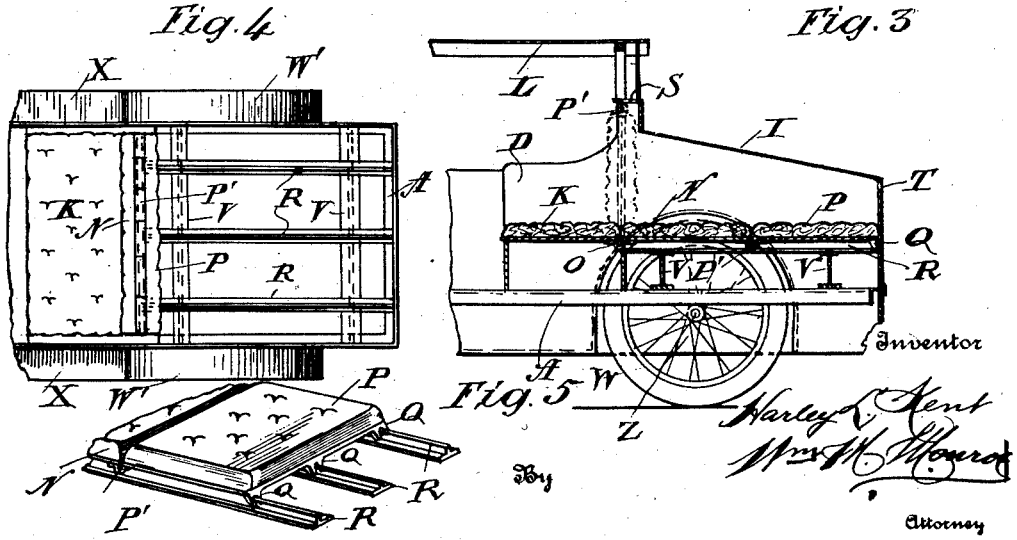

Patented Nov. 30, 1926.

1,608,512

UNITED STATES PATENT OFFICE.

HARLEY L. KENT, OF MANSFIELD, OHIO.

MOTOR CYCLE.

Application filed July 11, 1923. Serial No. 650,792.

The objects of the invention are to provide means for supplying a motor-cycle with accommodations for sleeping and for storing fuel and lubricating oils so that it can be employed for touring and long distance travel and can be used as a resting place at night thus making the driver independent of hotel service, and able to dispense with supply stations along the way.

To accomplish this result the frame of the motor-cycle is enclosed in a casing within which are provided a folding bed, and enclosures for fuel and lubricating oil and also including enclosures for the engine and front and driving wheels, thus protecting them from the elements.

It includes, a seat having a double folding back composed of parts hinged together and a hood extended rearwardly from the body of the casing and provided with horizontal rods upon which the folding parts of the bed may be extended thus enabling the driver to lie at full length upon the bed with his body protected from the elements and his head resting upon the seat of the car.

It includes, a horizontal frame, having its sides supporting the body and rear hood of the car and having its front portion narrowed and elevated, to provide a bearing for the steering wheel, also the engine and battery box and gasoline supply are positioned upon the front end of frame and a forwardly projecting hood having side doors for access to these parts enclosing the same.

The rear end or rear hood of the casing overhangs the folding bed members and also is provided with wheel boxes, the upper walls of which are extended forwardly to provide side fenders for the car.

The invention is hereinafter more fully described and illustrated in the accompanying drawings and specifically pointed out in the claims.

In the accompanying drawings Fig. 1 is a side elevation of the auto cycle. Fig. 2 is a longitudinal vertical section therethrough. Fig. 3 is a similar view enlarged of the body and rear hood. Fig. 4 is a horizontal section of the same, and Fig. 5 is a perspective of the folding bed and rail supports.

In these views A represents the frame, having a rectangular rear portion and tapering to an elevated front B in which the steering fork C is journaled. D is the body of the casing. E is the inclined front hood which is mounted upon the frame and is provided with side doors F. F. and encloses the battery G and the fuel tank H. I is the rear hood detachably mounted upon the rectangular portion of the frame at J. A seat K is shown in the body of the car and a canopy L covers the body portion. M is the wind shield, N is the vertical back of the seat, pivoted at O to the rear edge thereof. The back is double and the rear portion P thereof hinged at P′ to the front portion N at the upper edge thereof.

This double back may be extended as shown in Fig. 3 to form a bed underneath the hood and the lower edge of the rear seat portion P is provided with guide means such as the forked lugs Q. Q. which engage the horizontal rails R. R. which extend from the seat to the rear of the frame above the same and permit the folding bed to be extended thereon and prevent it from moving laterally thereon.

The upper edge of the rear hood is preferably extended over the edge of the double seat at S and protects the seat from the elements.

A ventilating opening T or openings permit circulation of air in the hood so that the person lying thereon will not suffer from the heat in warm weather and the hood excludes the elements in severe winter weather.

The canopy L protects the head and shoulders of the occupant of the bed.

The bed is preferably raised to a level with the seat by means of transverse beams V. V. secured to the frame.

The driving wheels W are enclosed in wheel boxes W′ by means of extensions of the side fenders X which rise above them and are secured to the sides of the hood, and the boxes are provided with side doors X′ which extend to the lower edges of the hood and can be opened to facilitate the removal of the wheels for substitution or repair.

The driving wheels are driven by a chain Y which is enclosed in a tube Y′ which is closed at both ends and is employed to enclose lubricating oil which supplies the lubrication required for long distance touring.

An opening $Y^2$ in floor $Y^3$ of the car and a removable closure $Y^4$ in the tube permit the supply of oil to be renewed. A drain $Y^5$ is used to remove the sediment.

The wheel axles Z are mounted upon resilient bearings Z′ Z′.

Having described the invention, what I claim as new, and desire to secure by Letters Patent is:

1. In a motor car, a frame, a body thereon having a detachable rear hood, a front seat and guide rails extending rearwardly therefrom at the same level, a mattress extendible over said front seat and rails, said mattress being separated into three portions hinged together, said mattress being foldable to form a front seat, or alternately therewith to be extended horizontally underneath said hood and a vertical double back connecting the same.

2. In a motor car, a frame, a body thereon having a detachable rear hood, a front seat and guide rails extending rearwardly therefrom at the same level, a mattress extendible over said front seat and rails, said mattress being separated into three portions hinged together, said mattress being foldable to form a front seat, or alternately therewith to be extended horizontally underneath said hood and a vertical double back connecting the same, said detachable hood being provided with a transverse member against which said vertical backs of said seats rest, when said hood is in place.

3. In a device of the character described, a frame, a seat thereon, a body in which said seat is mounted, a detachable hood covering the rear end of said frame, parallel rails extending from said seat underneath said hood, and a mattress extendible under said hood, the front portion of said mattress lying on said seat, said mattress being composed of three portions hinged together, the central portions being foldable back to back, the rear portion of said mattress being provided with engaging means for said guide rails.

In testimony whereof, I hereunto set my hand this 12th day of May, 1923.

HARLEY L. KENT.